Sept. 29, 1931.

F. L. WILLRODT

STEERING ATTACHMENT FOR TRACTORS

Re. 18,212

Original Filed Aug. 23, 1929 3 Sheets-Sheet 1

Inventor

F. L. Willrodt

By

Hiram A. Sturges

Attorney

F. L. WILLRODT

Sept. 29, 1931. STEERING ATTACHMENT FOR TRACTORS Re. 18,212

Original Filed Aug. 23, 1929 3 Sheets-Sheet 2

Inventor

F.L. Willrodt

By Hiram A. Sturges

Attorney

Sept. 29, 1931.

F. L. WILLRODT

STEERING ATTACHMENT FOR TRACTORS

Re. 18,212

Original Filed Aug. 23, 1929

3 Sheets-Sheet 3

Inventor

F. L. Willrodt

By

Hiram H. Stinger

Attorney

Reissued Sept. 29, 1931

Re. 18,212

UNITED STATES PATENT OFFICE

FRED L. WILLRODT, OF OMAHA, NEBRASKA, ASSIGNOR TO THE WILLRODT TRACTOR GUIDE COMPANY, OF OMAHA, NEBRASKA, A CORPORATION OF NEBRASKA

STEERING ATTACHMENT FOR TRACTORS

Original No. 1,776,940, dated September 30, 1930, Serial No. 387,869, filed August 23, 1929. Application for reissue filed July 6, 1931. Serial No. 548,996.

This invention relates to steering attachments for tractors and has reference to that class of attachments used for guiding the tractor during the operation of plowing, so that the plow, drawn by the tractor, will be correctly positioned in the land for turning the furrow.

One of the objects of the invention is to improve the construction shown and described in Letters Patent of the United States, No. 1,639,246, dated August 16, 1927, and issued to this applicant and which, for operation, depends upon the use of a pair of guide-discs arranged to travel in the bed of the furrow for causing the tractor to move in a line parallel with said furrow, a carrier-beam in all instances being used which extends forwardly for supporting the transverse shaft upon which the guide-discs are mounted.

One of the objects of the present invention is to provide such a mounting for the carrier-beam that the parts mounted thereon will not become injured while encountering obstructions or while crossing ditches. Another object is to provide a resilient support for the transverse shaft which carries the guide-discs so that it may be readily swung upwardly whenever required and will yieldingly resist downward swinging movements of the transverse shaft occasioned by vibration or when the discs enter depressions.

A further object is to provide a supporting bar pivoted at its upper end on the tractor and extending forwardly and downwardly and normally disposed in a vertical plane, with the transversely arranged disc-carrying shaft supported thereby.

Still another object is to provide a V-shaped holder for a chain which supports a swinging supporting shaft for a tractor guiding means.

It is an object of the invention to produce attachments for a tractor which will consist of few and simple parts, will be convenient in use, and may be manufactured at a very limited expense.

With the foregoing objects in view and others to be mentioned the invention presents a new and useful construction, combination and arrangement of parts as described herein and illustrated in the accompanying drawings, it being understood that changes may be made in form, size, proportion of parts and minor details, said changes being determined by the scope of the invention as claimed.

In the drawings, Figure 1 is a plan view showing the attachments applied to a part of the tractor.

Figure 4 is a view showing the connection of the steering arm with the steering post.

Figure 5 is a sectional detail showing the brace-bar extension slidingly mounted in the brace-bar.

Figure 1:
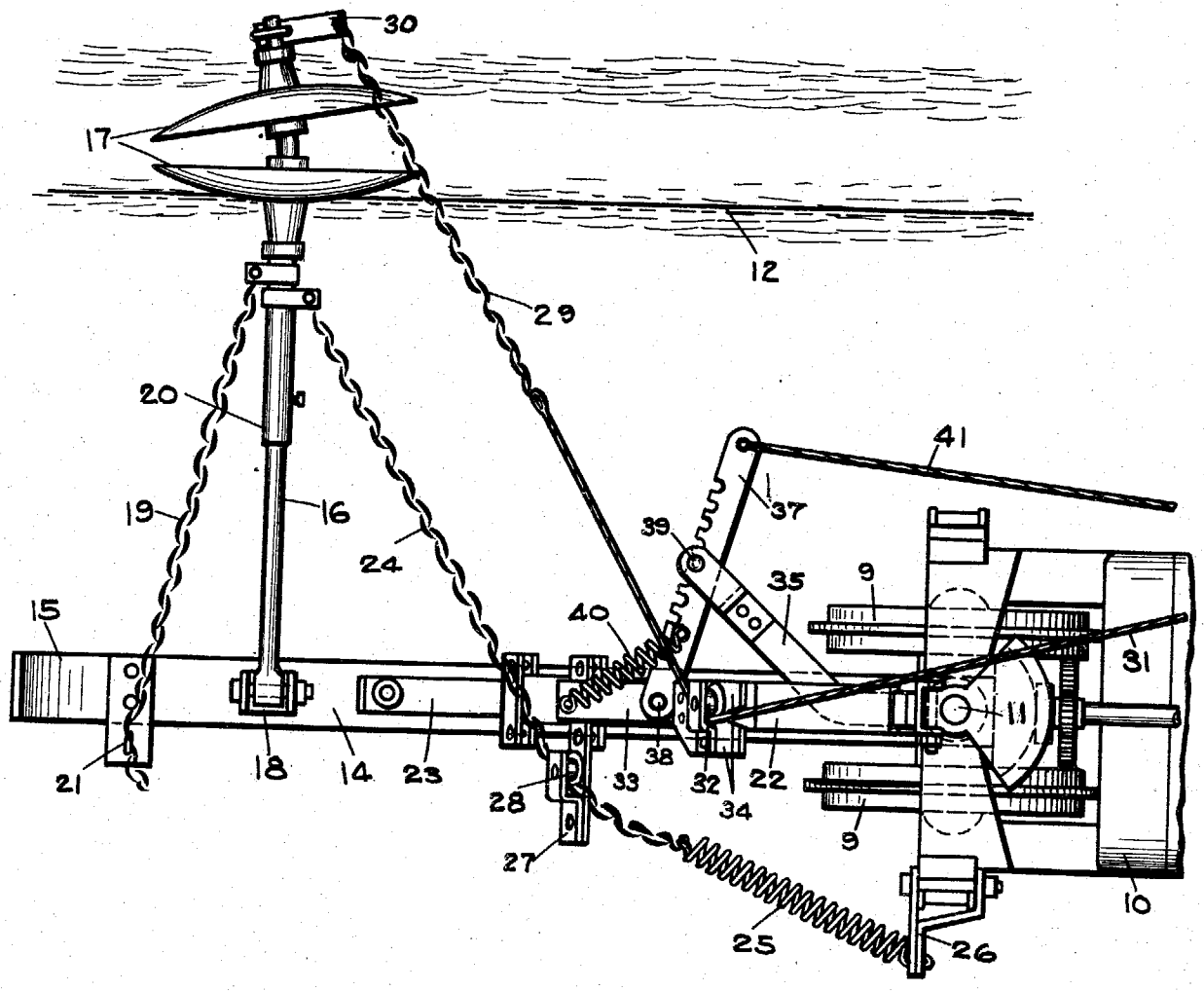
Figure 2:
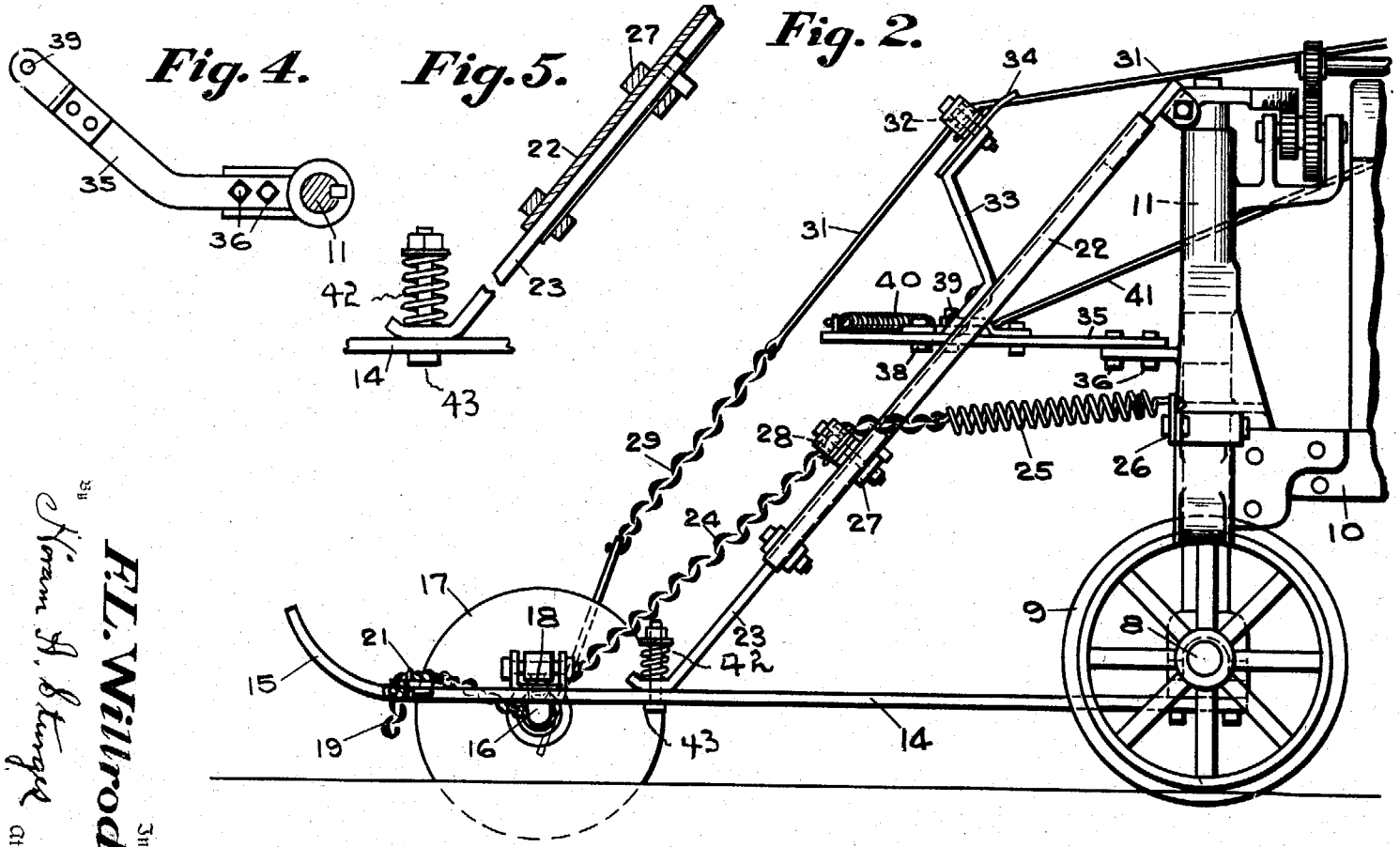
Figure 2 is a side view of the same.
Figure 3:
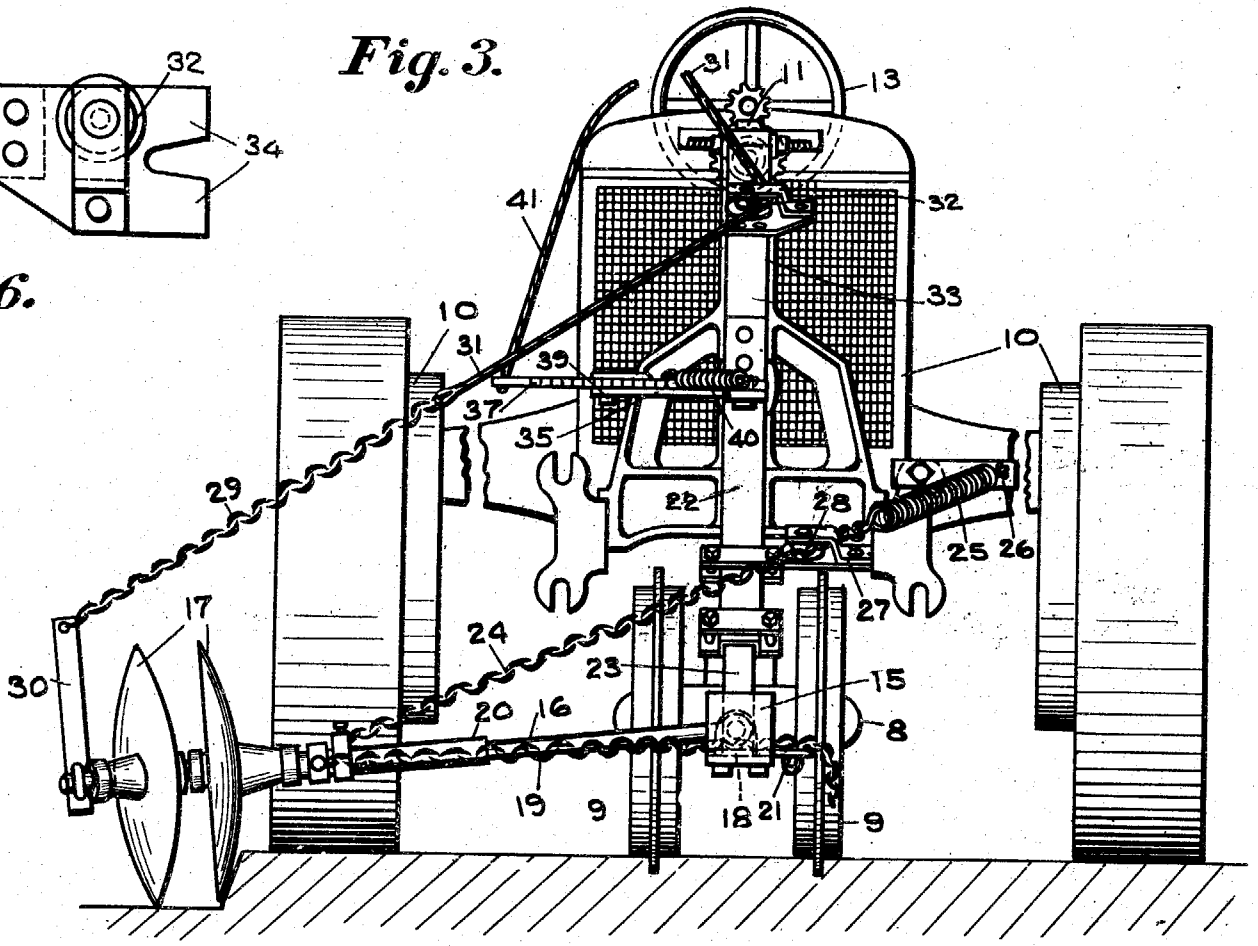
Figure 3 is a front view of the tractor and the steering attachments.
Figure 6:
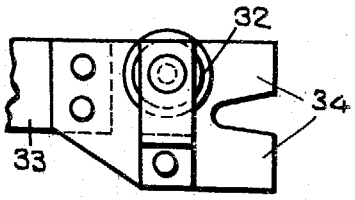
Figure 6 is a plan view of a detent plate for supporting a chain.

Referring now to the drawings for a more particular description, the invention is shown and described in connection with the axle 8 of the front truck wheels 9 of a tractor 10, the vertical steering post of the tractor being indicated at 11. Also the invention is described in connection with the furrow 12 formed in the ground at the side of the tractor, the hand-wheel for steering the tractor being indicated at 13.

Since the present invention relates simply to attachments which tend to automatically maintain the travel of the tractor parallel with the furrow, a description of parts for steering the tractor by use of the hand-wheel is not considered necessary. However, it may be stated that the driver uses the hand-wheel when "turning about" at the end of a field or when driving upon a highway.

In order that the objects may be attained as first mentioned a rigid carrier-beam 14 is employed, said beam extending forwardly from the axle 8, and having a mounting of its rear end to permit it to have swinging movements upwardly and downwardly as well as lateral swinging movements to cause a movement of other parts for automatic steering of the tractor, the front end of said beam being provided with a shoe 15. Numeral 16 indicates a supporting-shaft which provides journaled bearings near its end for a pair of ground-engaging elements or discs 17, the opposite end of the shaft being hinged to the carrier-beam as indicated at 18 to permit it to swing upwardly. The shaft 16 is disposed at right-angles to the beam 14.

Numeral 19 indicates a chain which is secured at its outer end to the sleeve 20 which receives the shaft 16, the opposite end of the chain being secured to a hook 21, said chain operating to resist stresses directed to the discs which are pressed rearwardly during operation while engaging the ground.

The sleeve 20 may be adjusted on the shaft 16 so that the discs may be disposed at selected distances from the beam 14, the chain also being adjusted to correspond with the adjustment of the sleeve.

Numeral 22 indicates a supporting or brace-bar preferably constructed of channel iron and having an extension 23 slidingly mounted therein, said brace-bar and its extension being disposed inclinedly, the upper end of the bar 22 being disposed on the top of the post 11, and the lower end of the extension being secured to the carrier-beam 14, and during the forward movement of the tractor when the shoe 15 strikes an obstruction and causes the beam 14 to swing upwardly the extension will slide in the brace-bar 22.

Numeral 24 indicates a chain which is secured at one of its ends to the sleeve 20, its opposite end being secured to a spring 25 at the "near" side of the tractor, a bracket 26 extending from the tractor being provided for the mounting of said spring.

Numeral 27 indicates a bracket which is mounted on the brace-bar 22 for the mounting of a pulley 28 to control the direction of movement of said chain.

Since the spring 25 is disposed at the "near" side of the tractor in a plane considerably above the sleeve 20 it operates effectively for elevating the discs from depressions in the ground. Also, as will be seen, this spring operates as an aid in the manual work of swinging the discs upwardly as is often required.

Numeral 29 indicates a third chain which is secured at one of its ends to a bracket 30 which is mounted on the end of the shaft 16 outwardly of the discs 17, the opposite end of the chain being secured to a strand 31, this combined chain and strand being for the use of an operator or driver for causing an upward swinging movement of the shaft 16, the sleeve 20, chain 19 and discs 17, the shaft 16 moving about its hinge 18. This upward swinging movement is frequently required during operation, and it will be appreciated that the spring 25 is a material aid in this operation.

The strand 31 and chain 29, in succession, engage a pulley 32 which is mounted on a bracket 33, said bracket being mounted on the inclined brace-bar 22, for the control of direction of said chain and strand. In this operation, the strand is drawn rearwardly until the discs have been elevated and at that time the chain 29 may be disposed with one of its links caught between the pair of teeth 34, said teeth being arranged as a V-shaped member and disposed rearwardly of and adjacent to the pulley 32. In operation, to detach the chain from the teeth 34, the operator, by the use of the strand 31, may pull the chain so that its link will be disengaged from the teeth, and the shaft 16 together with the parts thereon may be permitted to swing downwardly, said downward swinging movement being against the force of the spring 25.

While I have shown and described a chain 19 it is obvious that a bar or rod would resist stresses, and I may use any suitable element for this purpose, but prefer a chain, so that the adjustments mentioned may be conveniently made. Also it is obvious that a flexible strand could be substituted for the chain 24 and I do not wish to be understood as limiting myself to the use of the chain 24.

Also a cable, rope or other flexible member could be substituted for the chain 29, but I prefer the use of this chain since a link may be caught between the teeth 34 for supporting the shaft 16 and parts thereon when said shaft has been swung upwardly.

Numeral 35 indicates a steering-arm which may be rigidly secured at its rear end to the steering-post 11, the means for securing it to said post being a screw-bolt or key 36, and the swinging movements of said arm 35 are depended upon for the steering, automatically, of the tractor so that its line of travel will be parallel with the furrow 12.

Number 37 indicates a toothed rack-bar or control bar which is pivotally mounted at its inner end as indicated at 38 upon the brace-bar 22. The steering-arm at its outer end is provided with a bolt 39, and at 40 is indicated a spring which is secured at its respective ends to the bar 22 and rack-bar 37, the operation of this spring tending to cause the rack-bar to swing forwardly for maintaining one of its notches in engagement with the bolt or pin 39 of the steering arm.

Since the supporting-beam 14 is mounted to permit lateral swinging movements on the axle 8 it is obvious that such movement will cause a part rotation of the steering-post and a corresponding swinging movement, horizontally, of the axle 8 for steering the tractor.

The normal position of the discs 17 is shown in Figure 1 of the drawings. The outer disc is disposed in angular relation to the inner disc of said pair, and the inner disc therefore is pressed against the earth at the "land side" of the furrow. Also the action of the spring 25 aids in maintaining the inner disc of said pair in engagement with the vertical wall of the furrow. Therefore, if the tractor when moving over obstructions should deviate from a line parallel with the furrow the steering-arm would have a limited swinging movement, and the supporting-beam would have a corresponding swinging movement, the result being that the discs would be moved to an abnormal position. However, the discs, on account of the construction as described very soon assume a normal position, for maintaining the travel of the tractor in a line parallel with the furrow.

Numeral 41 indicates a pull-rope for use of the driver of the tractor, the front end of the rope being secured to the end of the rack-bar 37. By use of the rope or strand 41 the rack-bar may be swung rearwardly so that it will not be engaged by the pin 39, and this may be done whenever the operator wishes to use the hand-wheel 13 when the attachment is not in use.

It is obvious that an ordinary link or lever could be substituted for the rack-bar 37 and operation would be the same in all respects except that certain adjustments could not be made, and therefore I do not wish to limit myself to the use of a rack-bar.

Also while two discs 17 have been shown and described which travel in the bed of the furrow it is obvious that the outer, angularly disposed disc could be dispensed with since the action of the spring 25 will cause said inner disc to engage the "land side" wall of the furrow 12. Since the carrier-beam 14 and the brace-bar 22 are pivotally mounted on the tractor the spring 25 operates to urge them toward the "near" side of the tractor, said inner disc operating as a detent and, by this resilient action being pressed against the "land side" wall of the furrow.

During the operation of plowing, the chain 29 and its strand 31 are not held in taut condition, and therefore the discs may enter the ground in the bed of the furrow, the weight of the shaft 16, its sleeve 20 and adjusting chain 19 aiding in a suitable engagement of the discs in the ground, this downward pressure occasioned by the weight of said parts being under control of the spring 25 as above explained.

Since the extension 23 is slidingly mounted in the brace-bar 22 its lower end is secured to the carrier-beam 14 by means of a spring 42 said spring being mounted on a bolt 43 which traverses the lower end of said extension, and therefore when the curved end-portion or shoe 15 strikes an obstruction the spring 42 will permit a slight rocking movement so that the extension may have a free sliding movement in the channel of the bar 22.

The object in view in providing the rack-bar 37 is to provide a detachable mounting for the steering-arm 35 so that the pivot-pin 39 may engage in any selected notch of said rack-bar. In some instances it may be desired to cause the tractor to travel with its "off" wheel disposed in the furrow 12, or closer to or further from said furrow, and when plowing ground which has a surface which has an inclination transverse to the line of traction it is often an advantage to adjust the rack-bar so that the pin 39 will engage in a notch nearer to its outer end than shown in the drawings. When this adjustment has been made the distance of the front part of the beam 14 from the furrow 12 will not be changed but the tractor will travel further toward the "off" side than before, and the adjustments mentioned are often required in the operation of plowing hillsides and in valleys.

The beam 14, bar 22 and its extension 23 together constitute a rock bar or supporting-bar which is normally disposed in a vertical plane at the medial line and mounted to permit swinging movement of its lower or forward end transversely of the tractor, thereby providing a support for the swinging guide engaging in a furrow. The parts 22 and 23 are inclined downwardly and forwardly and the part 22 receives the connection of the control bar 37. The projecting part of the beam 14 furnishes a horizontal part at the lower end of the rock bar or supporting-bar, and to this horizontal part the swing arm or supporting shaft 16 for the guide is pivotally connected. The guide and guide-bar move the rock bar and through it the rack-bar or supporting-bar or control bar 37 and the steering-arm for steering the tractor.

I claim as my invention:—

1. In attachments for maintaining the travel of a tractor parallel with a ground-furrow, said tractor being provided with steering devices, a carrier-beam mounted on the tractor to permit swinging movements thereof, a brace-bar mounted on the tractor and disposed above the carrier-beam, an extension member slidingly connected with the brace-bar and mounted on the carrier-beam, a supporting-shaft hinged to said beam and having a disc for engaging in said furrow, a spring connected with the tractor and attached to the supporting-shaft for pressing the disc toward the land-side of the furrow, and mechanism on the brace-bar and engaging said steering devices for moving the steering devices of the tractor by a movement of said carrier-beam.

2. In attachments for maintaining the line of travel of a tractor parallel with a ground-furrow, said tractor having a steering-post, a carrier-beam movably connected with and extending forwardly from the tractor, a brace-bar mounted on the tractor and disposed above the carrier-beam, an extension-member mounted on the carrier-beam and having a part slidingly engaging said brace-bar, a steering-arm mounted on the steering post, a link mounted to permit swinging movements on the brace-bar and pivotally connected with the steering-arm, a supporting-shaft mounted on the carrier-beam to permit swinging movements therefrom and having a disc for engaging in said furrow, and a resilient element connected with the tractor and the supporting-shaft for pressing said disc against a wall of said furrow.

3. In attachments for maintaining the travel of a tractor parallel with a ground furrow, said tractor having a steering-post, a carrier-beam mounted on the tractor to permit swinging movements therefrom, a brace-bar mounted on the tractor and having a part connected with the carrier-beam, a bracket mounted on the brace-beam provided with a V-shaped holder, a pulley mounted on said bracket, a steering-arm mounted on the steering-post, a link mounted to permit swinging movements on the brace-bar and pivotally connected with the steering-arm, a supporting-shaft hingeably mounted on the carrier-beam and having a disc normally engaging in said furrow, a spring connected with the tractor and connected with the supporting-shaft for urging said disc toward the land-side of said furrow, a chain mounted on the supporting-shaft and having a part engaging said pulley, said chain being adapted to be moved for causing the supporting-shaft and disc to swing upwardly from said furrow, one of the links of said chain moving into locked relation with said V-shaped holder, said chain being movable for releasing its link from said V-shaped holder to permit the supporting-shaft and said disc to swing downwardly against the force of said spring.

4. In attachments for maintaining the travel of a tractor parallel with a ground furrow, said tractor having a steering-post rigid with its axle, a carrier-beam mounted on said axle to permit swinging movements therefrom, a brace-bar connected with the steering-post, an extension-bar resiliently mounted on the carrier-beam and slidingly connected with said brace-bar, detachably connected devices mounted on the brace-bar and steering-post for causing a movement of the steering-post by a movement of the carrier-beam, and a supporting-shaft hingeably mounted on the carrier-beam and having discs adapted to engage in said furrow.

5. In attachments for maintaining the travel of a tractor parallel with a ground furrow, said tractor being provided with a steering-post, a carrier-beam extending forwardly from and mounted on the tractor to permit lateral swinging movements thereof, a supporting-shaft hinged to the carrier-beam and having a guide normally engaging in said furrow, a brace-bar mounted loosely on the steering-post and having a part provided with a channel, an extension-bar resiliently mounted on the carrier and slidingly mounted in said channel, a steering-arm mounted on the steering-post, and a link pivotally mounted at its respective ends on the brace-bar and steering-arm for causing movements of said steering-arm by the movements of the carrier-beam.

6. In attachments for maintaining the travel of a tractor parallel with a ground furrow, said tractor having a steering-post, a carrier-beam extending forwardly of and mounted to permit swinging movements from the tractor, a supporting-shaft mounted upon and disposed transversely of said beam and having a guide normally disposed in said furrow, a brace-bar connected with the tractor and movable with the carrier-beam, an extension-bar having a part slidingly engaging the carrier-beam, a bolt traversing the extension-bar and said beam, a spring on said bolt, a steering-arm rigid with the steering-post, and a link connected at its respective ends with the brace-bar and steering-arm to cause movements of the steering post by the movements of the carrier-beam.

7. In attachments for maintaining the travel of a tractor parallel with a ground furrow, said tractor being provided with a steering-post, a carrier-beam pivotally connected with the tractor, a brace-bar connected with the tractor and carrier-beam and movable with said beam, a bracket secured to the brace-bar and provided with a V-shaped holder, a supporting-shaft mounted on said beam to permit swinging movements thereof in a circle's arc therefrom, discs mounted on said shaft for engaging in said furrow, a flexible member connected with the supporting-shaft and adapted to be moved in said V-shaped holder, a steering-arm rigidly mounted on the steering-post and provided with a detent pin, and a spring controlled rack-bar normally engaging the detent-pin of the steering-arm and pivotally mounted on said brace-bar.

8. In a steering attachment for tractors, a steering arm operatively connected with a steering wheel of the tractor to impart steering movement thereto, a rock bar having a rigid inclined part normally disposed in a vertical plane and mounted on the tractor to permit swinging movements of the lower forward end thereof transversely of said tractor, a control bar operatively connected with said rock bar and with said steering arm, and a guide for engaging in a furrow and adapted to thereby be moved for moving said rock bar, said control bar and said steering arm.

9. In a steering attachment for tractors, a steering arm operatively connected with a steering wheel of the tractor to impart steering movement thereto, a rock bar mounted on the tractor to permit swinging movements of one end thereof, said rock bar having a downwardly and forwardly inclined part normally disposed in a vertical plane, a guide for engaging in a furrow and adapted to thereby be moved for moving said rock bar, and an operative, disengageable connection between the inclined part of said rock bar and said steering arm, the parts of said rock bar being rigidly connected against relative lateral movement, whereby movement of said guide is communicated therethrough for moving the steering arm.

10. In a steering attachment for tractors, a steering arm operatively connected with a steering wheel of the tractor to impart steering movement thereto, a rock bar mounted on the tractor to permit swinging movements of one end thereof, said rock bar having a downwardly and forwardly inclined part normally disposed in a vertical plane, a guide for engaging in a furrow and adapted to thereby be moved for moving said rock bar, and an operative, spring controlled, disengageable connection between the inclined part of said rock bar and said steering arm, the parts of said rock bar being rigidly connected against relative lateral movement, whereby movement of said guide is communicated therethrough for moving the steering arm.

11. A steering attachment for tractors, a steering-arm connected with the steering mechanism of the tractor, a rock-bar having a rigid inclined part normally disposed in a vertical plane at the medial line and mounted on the tractor to permit swinging movements of its lower end transversely of said tractor, a control-bar mounted on the rock-bar and connected with the steering-arm, a swing-bar mounted on the lower end of the rock-bar and having a guide for engaging in a furrow and adapted to be moved for moving the rock-bar, said control-bar and said steering-arm.

12. In a tractor guide for a tractor having front steering wheels and a steering mechanism for steering the tractor, a supporting bar having a rigid inclined part mounted at its upper end on the tractor to permit swinging movements thereof transversely of the line of travel of said tractor, a steering-arm mounted on the steering mechanism of the tractor, a control-bar connected with the steering-arm and with said supporting bar, and a guide bar pivotally connected with the lower end of the supporting bar and having a guide adapted to travel in a furrow for moving the guide bar, said supporting bar and the steering mechanism of the tractor.

13. In a tractor guide for a tractor having front steering wheels and provided with steering mechanism for steering the tractor, a supporting bar having a rigid inclined part pivotally mounted at its upper end on the tractor and having a horizontal part at its lower end, a forwardly projecting steering-arm mounted on the steering mechanism of the tractor, a control bar connected with the steering-arm and with the supporting bar, a guide-bar pivotally mounted on the lower horizontal part of the supporting bar and having a guide adapted to move in a furrow and moving the guide-bar, said supporting bar and the steering mechanism of the tractor.

14. In a tractor guide for a tractor having front wheels and provided with steering mechanism, a supporting bar having a rigid inclined part having its upper end pivotally connected with the tractor, a steering-arm mounted on the steering mechanism and projecting forwardly of the tractor, a control bar pivotally connected at one end with the supporting bar and having a pivotal connection with said steering arm, a guide-bar having a pivotal connection with the lower end of the supporting bar and having a guide adapted to travel in a furrow for moving the guide bar, said supporting bar, said control-bar and the steering mechanism of the tractor.

15. In a tractor guide, a steering arm rigidly secured to the steering mechanism of the tractor, a supporting-bar mounted on the tractor to permit swinging movements transversely of the line of travel, said bar being formed with a rigid inclined part normally disposed in the vertical plane of a portion of the steering-arm and being movably connected with said arm, a guide bar mounted on the supporting bar and having a guide adapted to engage in a furrow for actuating the guide-bar, the supporting bar and said steering-arm.

16. In a tractor guide, a steering-arm projecting forwardly from and rigidly connected with the steering mechanism of the tractor, a supporting bar having a rigid inclined part pivotally mounted at its upper end on the tractor and connected between its ends with the steering-arm, a guide-bar pivotally mounted on the lower end of the supporting bar, and a guide mounted on the guide-bar to travel in a furrow for moving the guide-bar, said supporting bar and the steering-arm.

17. In a tractor guide, a rigid supporting bar inclined forwardly and downwardly at the front of the tractor and having an approximately horizontal lower end portion, means on the tractor providing a pivotal mounting for the upper end portion of the supporting bar, a steering-arm rigidly connected with the steering mechanism of the tractor and movably connected with the supporting bar, and a guide-bar mounted on the lower approximately horizontal end portion of the supporting bar and having a guide adapted to travel in a furrow for moving the guide-bar, the supporting bar and said steering arm.

18. In attachments for maintaining the travel of a tractor parallel with a ground furrow, said tractor being provided with steering mechanism, a rock bar pivotally connected with the tractor, a bracket secured to the rock bar and provided with a V-shaped holder, a guide-bar mounted on said rock bar to permit swinging movement thereof in an arc, guides on said guide bar for engaging in a furrow, a flexible member connected with the guide-bar and adapted to be moved in said V-shaped holder, a steering arm connected rigidly with the steering mechanism, and operative connections between said rock bar and said steering-arm.

19. In attachments for maintaining the travel of a tractor parallel with a ground furrow, said tractor having a steering mechanism, a rock bar mounted on the tractor to permit swinging movements therefrom, a bracket mounted on the rock bar provided with a V-shaped holder, a pulley mounted on said bracket, a steering-arm rigidly connected with the steering mechanism, a supporting shaft hingeably mounted on the rock bar and having a disc normally engaging in said furrow, a chain connected with the supporting shaft and having a part engaging said pulley, said chain being adapted to be moved for causing the supporting shaft and disc to swing upwardly from the furrow, one of the links of said chain being adapted to move into locked relation with said V-shaped holder for holding the supporting shaft and disc in elevated position, said chain being movable for releasing its link from said holder to permit the supporting shaft and disc to swing downwardly.

Des Moines, Iowa June 27, 1931.

FRED L. WILLRODT.